April 27, 1965  E. H. OCKERT, JR  3,180,390
SECURING DEVICE
Filed March 14, 1962　　　　　　　　　　　　　　　　　2 Sheets-Sheet 2
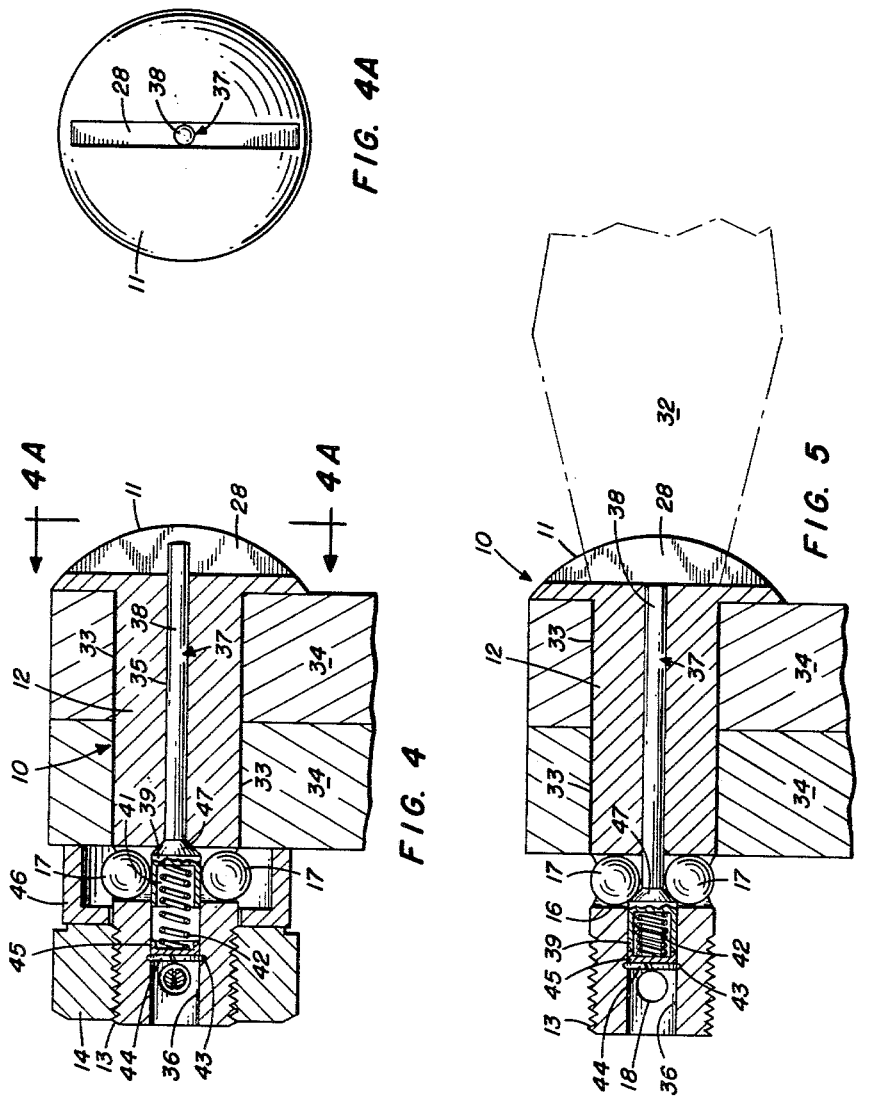
INVENTOR
EDWARD H. OCKERT, JR.
BY Claude Funkhouser
ATTORNEY
Cornelius J. Husar
AGENT United States Patent Office 3,180,390
Patented Apr. 27, 1965

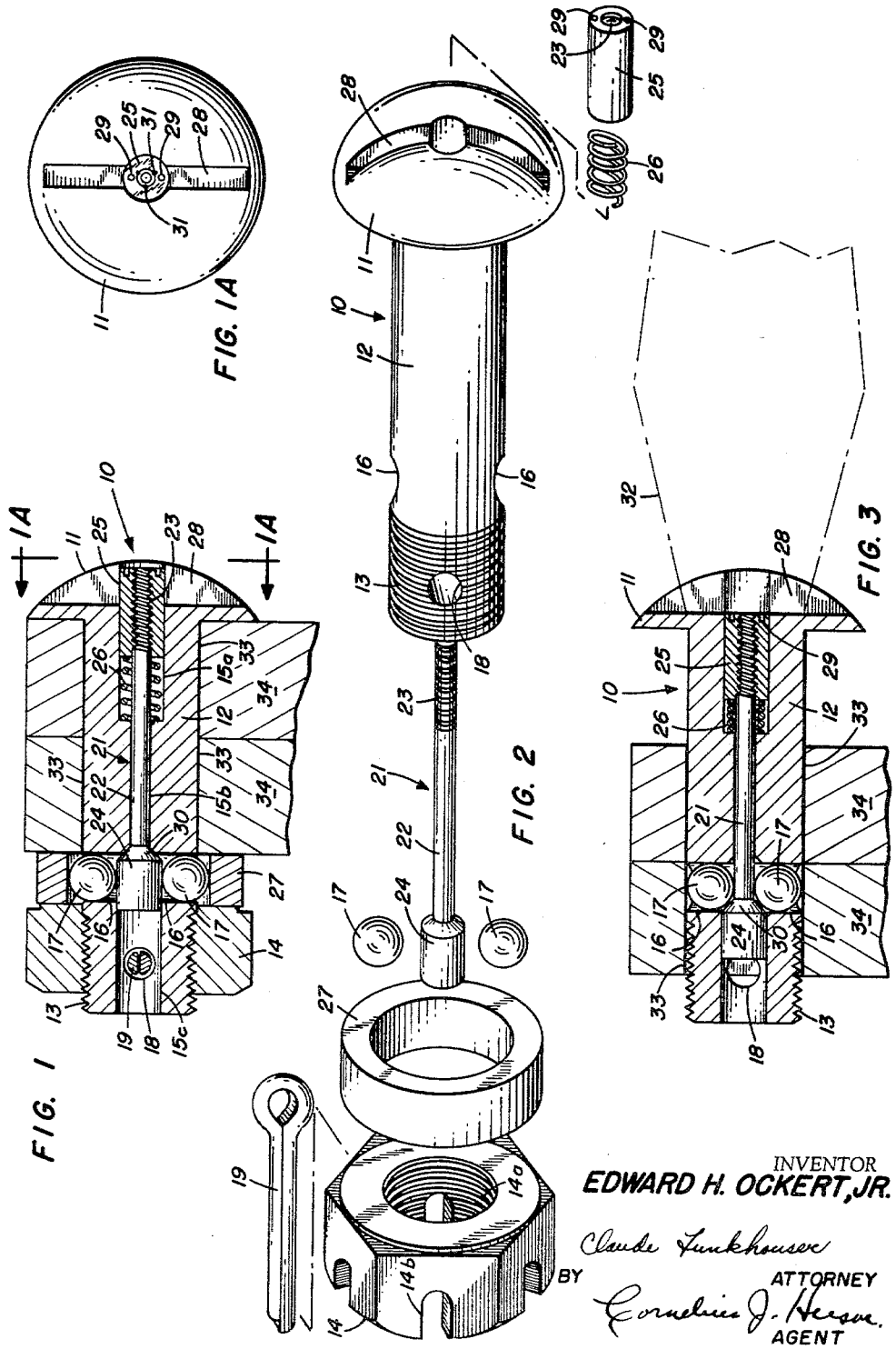

3,180,390
SECURING DEVICE
Edward H. Ockert, Jr., 1600 N. Stafford St.,
Arlington, Va.
Filed Mar. 14, 1962, Ser. No. 179,821
2 Claims. (Cl. 151—69)
(Granted under Title 35, U.S. Code (1952), sec. 266)

The invention described herein may be manufactured and used by or for the Government of the United States of America for governmental purposes without the payment of any royalties thereon or therefor.

The present invention relates to a nut and bolt combination and more particularly to an improved nut and bolt combination which possesses safety features heretofore unknown in the nut and bolt art.

Prior to applicant's invention it has been the general practice in the aircraft industry to use bolts with castellated nuts and cotter pins to prevent the nut from becoming loose due to the vibration of the aircraft. On several occasions, after maintenance inspections or after repairs have been made on an aircraft there have been instances where the bolt was inserted through the members to be secured together, but for some reason or other, the nut had not been fully threaded onto the bolt. In other instances, the nut was completely omitted from the bolt.

It can readily be seen that such mistakes or oversights on the part of ground maintenance crews could quite possibly result in the loss of a pilot and an aircraft should the bolt slide free of the members thus disconnecting the control linkage.

In an effort to overcome this problem steps have been taken to provide greater security for vital control systems. Particular attention being given to the control systems of an aircraft which must be frequently disconnected. In seeking a solution to this problem it has been found that it is imperative for the clamping action of the conventional bolt and castellated nut plus the safety afforded by the cotter pin to be incorportaed into any substitute type of locking device. It has also been determined that the bolt is required to have full shear strength in the section subjected to shear forces.

Also, in the aircraft application of the instant device it becomes obvious that specific tolerances must be maintained and also specific standards as to shear and tensile strengths of this bolt and nut combination must be met before it can be accepted for military and commercial uses. Thus, it is understandable that the various balllock devices which were designed for quick-disconnect and blind applications have excessive dimensions and are not compatible with nuts and cotter pins and therefore unsuitable for this purpose. Nor is the required shear and tensile strengths present in such devices.

Although a conventional bolt and castellated nut with a cotter pin is secure when correctly installed, the possibility of faulty insertion of the bolt, nut or cotter pin has proven too subject to human error since on several occasions the cotter pins have been omitted or incorrectly installed with a resulting failure while the aircraft is in flight.

An object of the present invention is the provision of an externally threaded bolt which cannot be lost after its insertion.

Another object of the invention is the provision of an improved nut and bolt combination which possesses safety features heretofore unknown.

A further object of the invention is to provide a bolt and nut combination that possesses the desired shear and tensile loading features of a conventional bolt and nut.

Still another object of the invention is to provide an improved nut and bolt combination with means for preventing damage to the bolt retaining means.

Other objects and many of the attendant advantages of this invention will be readily appreciated as the same becomes better understood by reference to the following detailed description when considered in connection with the accompanying drawings wherein:

FIG. 1 is a sectional view of a preferred embodiment of the invention in its assembled and locked position.

FIG. 1A is an end view of FIG. 1 looking in the direction of the arrows.

FIG. 2 is an exploded view of the embodiment shown in FIG. 1.

FIG. 3 is a sectional view of the embodiment shown in FIG. 1 in its unlocked position with the nut removed.

FIG. 4 is a sectional view of another embodiment of the invention in its assembled and locked position.

FIG. 4A is an end view of FIG. 4 looking in the direction of the arrows.

FIG. 5 is a sectional view of the embodiment shown in FIG. 4 in its unlocked position with the nut removed.

Referring now to the drawings, wherein like reference characters designate like or corresponding parts throughout the several views, there is shown in FIG. 1, which illustrates a preferred embodiment of the invention, a bolt 10 having a head 11 and shank portion 12. The lower end of shank 12 being threaded as shown at 13 for receiving a castellated nut 14.

Bolt 10 is provided with a centrally located bore which has an upper portion, intermediate portion and end portions, designated 15a, 15b and 15c, respectively. End portion 15c of the bore is provided with a pair of radial apertures 16 which are of lesser diameter than balls 17 and serve to contain them within shank 12. The lower end of end portion 15c is provided with a second pair of radial apertures 18 which are of less diameter than apertures 16. Apertures 18 are located in the threaded portion 13 and receive a cotter pin 19 which restrains the castellated nut from coming loose of the shank 12.

Inserted into the bore within shank 12 is a plunger 21. The plunger 21 consists of a shaft portion 22, the upper end of which is threaded at 23. The lower end of plunger 21 is provided with an enlarged portion 24 with a taper at 30 for urging balls 17 radially outward. Attached to the upper end of shaft portion 22 is a spring retainer 25 which is affixed thereto by means of threads 23. A spring 26 is concentrically mounted over shaft portion 22 within upper bore 15a.

A spacer 27, which is of larger diameter than the shank 12 with the balls 17 extending therefrom, and of sufficient thickness to prevent the balls 17 from being damaged when the nut 14 is threaded onto the shank portion 12, is located between nut 14 and member 34.

FIG. 1A, which is an end view of FIG. 1, illustrates the head 11 of bolt 10 with a screwdriver slot 28. There is also shown the spring retainer 25 which is provided with a pair of openings 29 for receiving a spanner wrench or some other tool. The spring retainer is staked at 31 to insure that the retainer 25 does not come loose from shaft 22 of the plunger 21.

FIG. 2 is an exploded view of FIG. 1 showing the relationship of the various parts before being assembled and locked.

FIG. 3 illustrates the position of balls 17 with respect to the shank portion 12 of bolt 10. It is to be noted that the insertion of a screwdriver 32 into the slot 28 will, upon the application of pressure to the screwdriver 32, compress spring 26 and move plunger 21 inwardly. Inward movement of plunger 21 permits the enlarged portion to move out from between balls 17 thus permitting the balls 17 to ride down the taper 30. When the spring 26 is compressed as shown, the balls 17 move radially inward to the extent that the outermost peripheral portion of balls 17 are flush with shank portion 12 of bolts 10 thus permitting the bolt 10 to be inserted or removed from the apertures in members 34.

It can readily be seen that when the screwdriver 32 is removed from slot 28 the plunger 21 is urged outwardly by spring 26. As the plunger 21 moves outwardly, the taper 30 on lower portion 24 engages balls 17 and urges them radially outward. As pointed out above, the diameter of apertures 16 is less than the diameter of balls 17 permitting the balls 17 to protrude beyond the shank 12 and thereby preventing the bolt 10 from sliding through apertures 33 in members 34 and keeping members 34 in their desired position.

FIG. 4, is a sectional view illustrating another embodiment of the instant invention. There is shown a bolt 10 having a head portion 11 and shank portion 12. The bolt 10 is provided with a centrally located bore which has an upper portion 35 and a lower portion 36, the latter being of larger diameter than the former. Inserted within this bore is a plunger 37 having an upper end 38 and a lower end 39. The lower end 39 of the plunger 37 is further provided with a recess 41 for receiving spring 42. The lower portion 36 of the bore in shank 12 is provided with a groove 43 which receives a snap ring 44 to hold a spring centering cap 45 in place and keeps the spring 42 from falling out of recess 41.

The embodiment illustrated in FIG. 4 employs a bridging washer 46 which acts as a spacing means and prevents the nut 14 from coming into contact with the balls 17 and doing any damage thereto. The principle of operation of the embodiment shown in FIG. 4 is the same as that of FIG. 1.

FIG. 4A is an end view of FIG. 4 illustrating the slot 28 in the head 11, also shown in the upper end 38 of the plunger 37.

FIG. 5 is a sectional view illustrating the position of the balls 17 and the plunger 37 when a force is applied to the upper end 38 of the plunger 37 by screwdriver 32 or some equivalent tool.

As can be seen from FIG. 5, the force applied at the upper end 38 of plunger 37 compresses the spring 42. As the spring is compressed the lower end 39 of plunger 37 moves down permitting the balls to move radially inward as the tapered portion 47 of the lower end 39 comes into contact with the balls 17. With the balls 17 in the innermost position the shank 12 of bolt 11 is free to be removed from members 34 permitting the members 34 to be separated. It is to be noted that in each embodiment of the invention, when the bolt is in its locked position, FIGS. 1 and 4, the cross-sectional area of the bolt 10 is at its maximum thus providing a maximum shear strength in this area.

In order to more fully describe the invention a description of its operation is provided below:

The members 34 which are to be secured together are each provided with an aperture 33 to receive the bolt 10. In order to insert the bolt 10 into the hole 33, a screwdriver 32 must be applied to the slot 28 as shown in FIG. 3. By inserting the screwdriver 32 the spring 26 is compressed as the plunger 21 moves down, permitting balls 17 to move radially inward. With the balls 17 in their innermost position, the bolt 10 may be inserted into the apertures 33 in the members 34. After the bolt 10 is inserted into the members 34, releasing the screwdriver 32 permits the plunger to be urged outwardly by the spring. As the plunger moves out the balls 17 are forced radially outward by the lower portion of the plunger. As pointed out above, the diameter of apertures 16 is less than the diameter of balls 17, thus, only a portion of balls 17 protrude beyond the shank portion 12 of bolt 11. The balls 17 will abut the member 34 and thus prevent the bolt 10 from falling out. Next, the washer 27 is inserted over the lower end of bolt 10. The washer 27 is of sufficient thickness to prevent the balls 17 from being crushed or damaged as the nut 14 is tightened up. The nut 14, having internal threads 14a and slots 14b, is then threaded onto threads 13 of the bolt shank 12 and securely fastened thereto. As a means of preventing the nut from loosening itself from bolt 10, a cotter pin 19 is inserted through the slots 14b in the nut and the opening 18 in the bolt.

It is to be noted that the balls 17 and the plunger 21 are to be made of stainless steel and steel, respectively. The reason for this being that the effectiveness of the device is dependent to a large extent on the balls and the plunger. It is apparent that a hard material which will not be readily deformed when subjected to loading is the type of material which would be best suited for this purpose.

Obviously many modifications and variations of the present invention are possible in the light of the above teachings. It is therefore to be understood that within the scope of the appended claims the invention may be practiced otherwise than as specifically described.

What is claimed is:

1. An improved fastening device capable of securing a plurality of plate members together and of carrying structural loads in both shear and tension comprising:

a bolt having a head, a shank, and a threaded end, said bolt having an axial bore extending throughout the entire length thereof comprising an intermediate bore portion near said bolt shank and an enlarged stepped bore portion near said bolt threaded end, said bolt shank having first and second transverse aperture means disposed near said threaded end, said first aperture means having a reduced area portion at the periphery of said bolt;

locking means normally disposed within said bolt and movable within said first aperture means to a position of projection at least partially through said reduced area portion of the first aperture means at the periphery of said bolt thereby being constrained from complete passage therethrough by said reduced area portion;

a castellated nut having internal threads for threadedly engaging the threaded end of said bolt and a cotter key normally extending through said second aperture means for engaging and preventing rotation of said castellated nut;

an annular spacer having an internal bore of constant radius over a substantial portion of its axial length, said spacer being separable from said nut and normally disposed about said bolt shank between said nut and said plate members, said spacer having an axial dimension at least as great as the axial dimension of said locking means and an internal dimension at least as great as the dimensions of said locking means when in said position of projection, whereby said spacer functions to prevent said locking means from being deformed when said nut is threaded onto said bolt;

a cylindrical plunger having a tapered transition terminating in a reduced diameter stem, said plunger being slidably received within said enlarged stepped bore portion and said stem being slidably received within said intermediate bore portion;

resilient means for biasing said plunger toward said bolt head to urge said locking means outward and partially through said first aperture means; and passage means in said bolt head for providing access to said plunger means whereby, upon insertion of a tool in said passage means, said plunger is urged toward said threaded end portion to permit said locking means to move inward so that said bolt can be inserted or withdrawn from an aperture in the plate members to be secured.

2. The improved fastening device of claim 1 wherein said resilient means comprises a spring disposed in a counterbore near said bolt head.

(References on following page)

References Cited by the Examiner

UNITED STATES PATENTS

| | | | |
|---|---|---|---|
| 1,283,346 | 10/18 | Spear | 151—5 |
| 1,433,410 | 10/22 | Passauer | 151—6 |
| 2,373,083 | 4/45 | Brewster. | |
| 2,853,112 | 9/58 | Poupitch | 151—69 |
| 2,901,804 | 9/59 | Williams. | |
| 2,906,311 | 9/59 | Boyd | 151—9 |

FOREIGN PATENTS 1,283,372  12/61  France.

OTHER REFERENCES

Weir et al., Abstract of Application, Serial No. 74,643, published April 10, 1951, 645 O.G. 679.

EDWARD C. ALLEN, *Primary Examiner*.

CARL W. TOMLIN, *Examiner*.